(12) United States Patent
Zhou et al.

(10) Patent No.: US 8,181,176 B2
(45) Date of Patent: May 15, 2012

(54) UNIFORM STORAGE DEVICE ACCESS USING PARTIAL VIRTUAL MACHINE EXECUTING WITHIN A SECURE ENCLAVE SESSION

(75) Inventors: Hua Zhou, Shanghai (CN); Vincent J. Zimmer, Federal Way, WA (US); Michael A. Rothman, Puyallup, WA (US); Yi Qian, Shanghai (CN); Junwei Stanley Chen, Shanghai (CN); Fujin Huang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 213 days.

(21) Appl. No.: 12/819,943

(22) Filed: Jun. 21, 2010

(65) Prior Publication Data

US 2011/0314468 A1    Dec. 22, 2011

(51) Int. Cl.
*G06F 9/455* (2006.01)
*G06F 3/00* (2006.01)
*G06F 13/00* (2006.01)

(52) U.S. Cl. ................. 718/1; 710/5; 711/100; 711/173

(58) Field of Classification Search .................... None
See application file for complete search history.

(56) References Cited

U.S. PATENT DOCUMENTS

| 5,062,042 | A | 10/1991 | Binkley et al. |
| 6,757,778 | B1 | 6/2004 | Van Rietschote |
| 7,203,808 | B2 * | 4/2007 | Rothman et al. ............... 711/163 |
| 7,260,820 | B1 | 8/2007 | Waldspurger et al. |
| 2005/0076155 | A1 * | 4/2005 | Lowell ............................. 710/1 |
| 2011/0161551 | A1 * | 6/2011 | Khosravi et al. .............. 711/103 |

OTHER PUBLICATIONS

International Search Report and Written Opinion received for PCT Patent Application No. PCT/US2011/038504, mailed on Jan. 2, 2012, 9 pages.

* cited by examiner

*Primary Examiner* — Meng An
*Assistant Examiner* — Benjamin Wu
(74) *Attorney, Agent, or Firm* — Steven Skabrat

(57) ABSTRACT

In a computing system having a processor package, an operating system, and a physical I/O device, a partial virtual machine is provided to instantiate a virtual I/O device corresponding to the physical I/O device, the virtual I/O device having a virtual I/O controller. The partial virtual machine includes an I/O port trap to capture an I/O request to the virtual I/O device by the operating system; an I/O controller emulator coupled to the I/O port trap to handle an I/O control request to the virtual I/O controller, when the I/O request comprises an I/O control request; an I/O device emulator coupled to the I/O port trap component to handle an I/O access request to communicate with the virtual I/O device, when the I/O request comprises an I/O access request; and a device driver coupled to the I/O controller emulator and the I/O device emulator to communicate with the physical I/O device based at least in part on the I/O control request and the I/O access request. The partial virtual machine executes within a secure enclave session within the processor package, improving security of I/O transactions by preventing access to the partial virtual machine by the operating system.

17 Claims, 5 Drawing Sheets

UNIFORM STORAGE DEVICE ACCESS USING PARTIAL VIRTUAL MACHINE EXECUTING WITHIN A SECURE ENCLAVE SESSION

BACKGROUND

1. Field

Embodiments of the present invention relate generally to computer systems and, more specifically, to system firmware and virtualization.

2. Description

Historically, computer systems, including personal computers (PCs), have used many different devices for storage of data. Each storage device provides certain capabilities and exhibits characteristics such as connection interface, access speed, capacity, and others. For example, storage devices include floppy disk drives, hard disk drives, solid state disk drives, CDROM drives, Universal Serial Bus (USB) "thumb" drives, and so on. New storage devices are continually being developed. To implement access to each new storage device, the operating system (OS) must evolve as well, typically by providing device driver software. The device driver software allows an application program, communicating through the OS, to read data from and write data to the storage device. As the number and types of storage devices proliferate, the burden on OS development becomes substantial. Further, access via the device driver to a storage device may be insecure, thereby allowing malicious users to read and/or modify input/output (I/O) traffic.

BRIEF DESCRIPTION OF THE DRAWINGS

The features and advantages of the present invention will become apparent from the following detailed description of the present invention in which.

DETAILED DESCRIPTION

Embodiments of the present invention comprise a system and method for providing a uniform storage device by implementing a partial virtualization machine (PVM). The PVM may be used to generate at least one virtual storage device above the various physical storage devices coupled to a computing system. Instead of providing specific device drivers for each of the supported storage devices, the OS may access an interface to the uniform storage device. The PVM may be executed within a Secure Enclave session, thereby providing improved security over existing storage device interfaces. In embodiments of the present invention, the uniform storage device may be available during boot time, as well as runtime, and may be OS-independent.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For an OS to interface with a specific storage device, usually a standard I/O interface is defined for the storage device by the manufacturer of the device. There are several I/O interfaces that have been in use over the years, such as Parallel PC/AT Attachment/AT Attachment Packet Interface (ATAPI) (commonly referred to as ATA) (ATAPI was adopted as part of ATA in INCITS 317-1998, *AT Attachment with Packet Interface Extension (ATA/ATAPI-4)*) available at www.t13.org/. Small Computer System Interface (SCSI) available at ansi.org, Universal Serial Bus (USB), Serial ATA (SATA), and others. In one embodiment of the present invention, the ATA interface may be used. In one embodiment, the PVM enumerates a virtual ATA device for access by the OS for each different physical storage device coupled to the computing system. These storage devices may be coupled to the computing system at boot time, or at any time thereafter, or may be removed from the system. For example, a USB thumb drive may be enumerated as an Integrated Drive Electronics (IDE) hard disk by the PVM either at boot time or during runtime. Thus, for example, hot plugging the USB thumb drive into the computing system may result in the USB thumb drive appearing to be visible as a hard disk to the OS.

Figure 1:
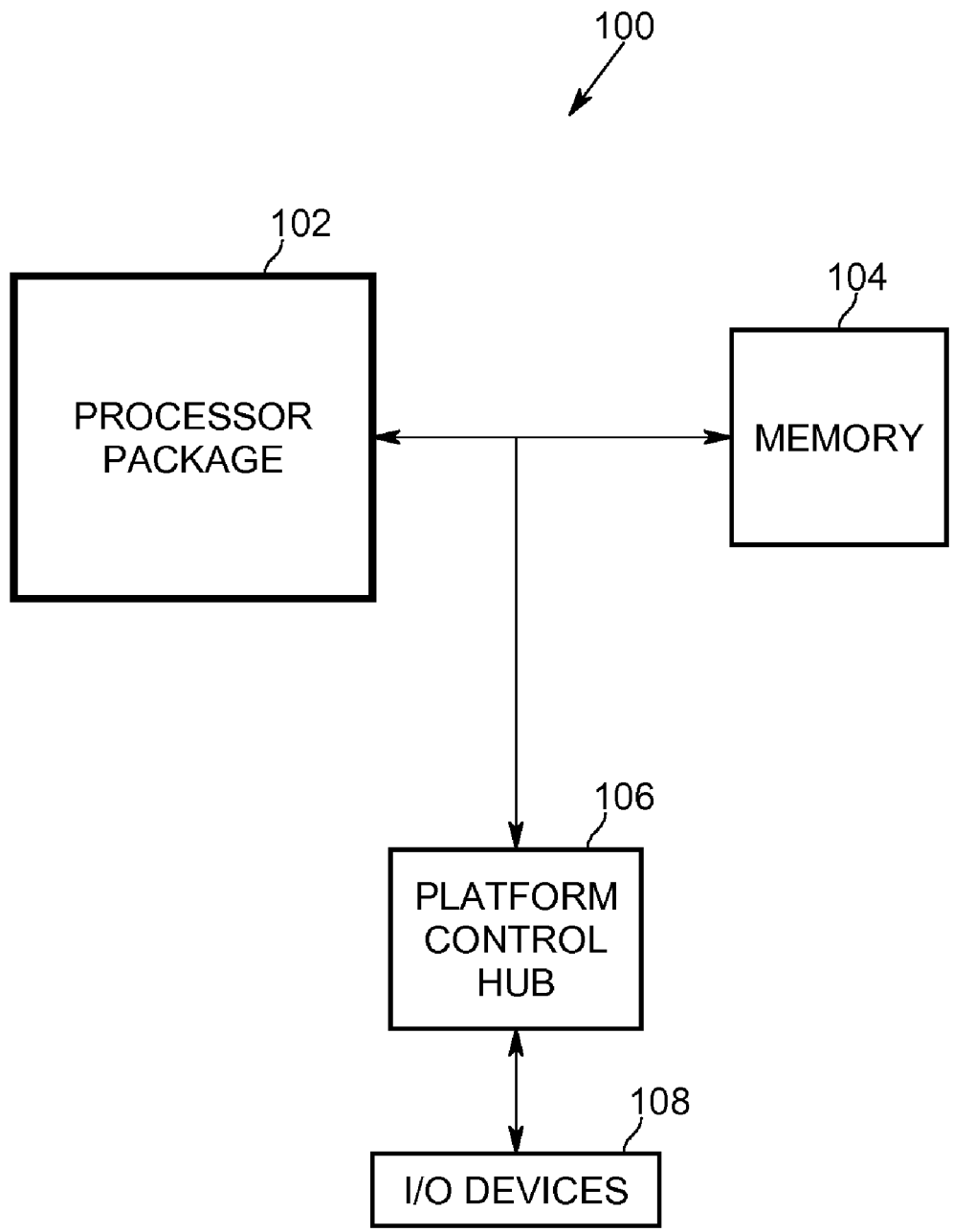
FIG. 1 is a diagram of a Secure Enclave session in a computing system according to an embodiment of the present invention.

In order to protect the uniform storage device from malicious access to the I/O, in embodiments of the present invention the PVM may be executed within a Secure Enclave (SE) session within the processor package of the computing system. FIG. 1 is a diagram of a Secure Enclave session in a computing system according to an embodiment of the present invention. For purposes of explanation, portions of computing system 100 are shown in FIG. 1 in simplified form. Processor package 102 comprises one or more processing cores within a security perimeter. In one embodiment, the security perimeter may be the processor package boundary (shown as a thick line in FIG. 1). The processor package interfaces with memory 104 and platform control hub (PCH) 106. The PCH interfaces with one or more I/O devices 108. Implementation of a Secure Enclave capability involves providing several processor instructions which create the secure enclave and enforce isolation and provide protection of instruction execution and data access. Data and code outside of the processor package may be encrypted and integrity checked. Data and code inside of the processor package may be unencrypted and protected by a mode and cache protection mechanism. In an embodiment, data does not "leak" from the secure enclave. Microcode within the processor package saves the enclave state information inside the enclave for interrupts, exceptions, traps and Virtual Machine Manager (VMM) exits. The Secure Enclave capability is described in the PCT patent application entitled "Method and Apparatus to Provide Secure Application Execution" by Francis X. McKeen et al., filed in the USPTO as a Receiving Office on Dec. 22, 2009, as PCT/US2009/069212, and incorporated herein by reference.

Figure 2:
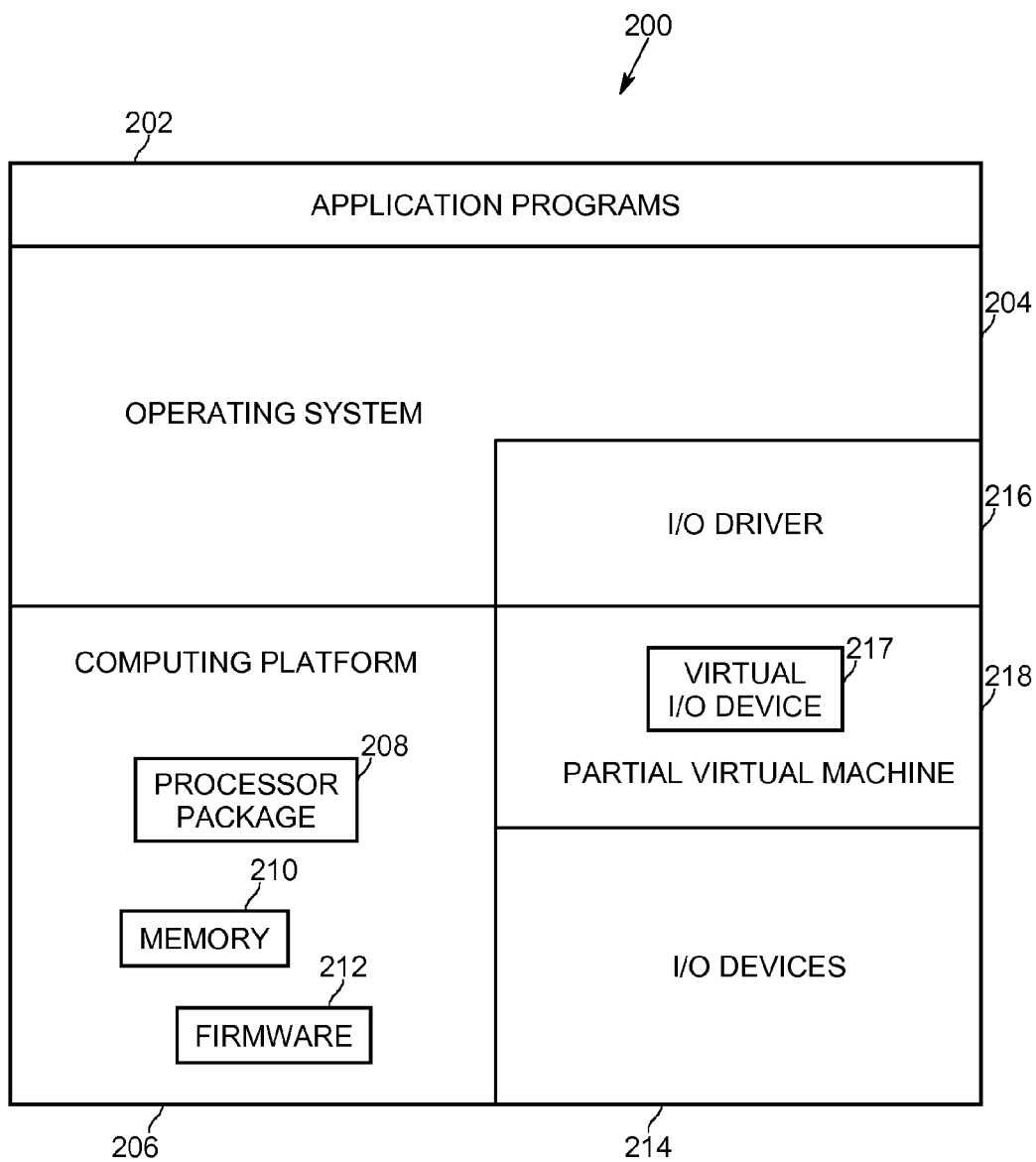
FIG. 2 is a diagram of a computing system according to an embodiment of the present invention.

FIG. 2 is a diagram of a computing system according to an embodiment of the present invention. In computing system 200, one or more applications programs 202 are being executed on the computing system. The computing system comprises conventional components such as operating system (OS) 204 and computing platform 206. Computing platform comprises processor package 208, memory 210, and firmware 212, as well as other conventional components that are not shown. Computing system 200 also comprises one or more I/O devices 214 (e.g., hard disk drives, CD-ROM drives, DVD drives, USB thumb drives, Blu-Ray players, solid state drives, network interface controllers (NICs), etc.). In embodiments of the present invention, when an application program needs to read data from or write data to one of the I/O devices, application program 202 interfaces with the OS 204. The OS then calls I/O driver component 216 to handle the I/O request. I/O driver 216 translates the OS requests and forwards the requests to the partial virtual machine (PVM) 218.

In embodiments of the present invention, the I/O driver calls PVM 218 to further handle the I/O request and communicate with a selected I/O device 214. Different than the concepts of full virtualization and para-virtualization as used in high end server computing systems, partial virtualization as used herein means that only some of the hardware components of the computing system are virtualized, while others are not. Virtualized components may be directly accessed by the OS (through its I/O driver component) via the PVM. Thus, in one embodiment, the PVM comprises a light-weight virtual machine (LVMM) and may be included as a code component in system firmware 212. In a version that is simpler than a typical LVMM, the PVM in embodiments of the present invention does not include a Service OS. By providing only partial virtualization, the PVM provides better performance than previous virtualization schemes, allowing the PVM to be used in lower performing computing systems. Where a Virtual Machine Manager (VMM) would typically trap and represent the system in its entirety, the PVM is intended to be a very light-weight solution (could easily also be called a microhypervisor) where a very small subset of the platform is actually virtualized such that trapping of I/O cycles are limited to a certain range (e.g. associated with access to a certain controller), but may not offer other "protection" against invalid memory accesses, or other things which otherwise might be more intrusive, require more system resources, or slow platform operations.

In an embodiment, the PVM may generate an instance of a uniform storage device called a virtual I/O device 217, for the OS, similar to other devices that the computing system has, and the OS will detect and use them without limitation. In one embodiment, the instantiated virtual I/O device 217 is a virtual ATA device. Thus, there may be a 1:1 mapping between a physical I/O device (e.g. a SATA controller) and a virtual I/O device. The number of virtual I/O devices that may be instantiated may be implementation dependent.

Because of this partial virtualization, only one OS instance may be run at a time, unlike in typical full virtualization modes which run multiple operating system instances simultaneously. This is the case because in the partial virtualization scenario, only a very small subset of the system may be implemented in the PVM. When a computing platform is fully virtualized, the entire computing platform is wrapped in a software model and can be duplicated repeatedly, so that the system may be split into n-pieces, running n-instances of OS targets. In a PVM, the resources may be limited.

In embodiments of the present invention, the PVM operates as a translator between the OS and the underlying hardware, and the communication "language" may be the ATA interface specification (when the virtual I/O device is a virtual ATA device). In other embodiments, virtual I/O devices may be instantiated for other interface specifications. When the OS needs to read data from or write data to the uniform storage device (the virtual ATA device in this example), following the ATA interface specification, I/O driver 216 in OS 204 sends ATA commands to the uniform storage device by reading or writing specific I/O ports (such as 0x1F7 or 0x3F7). PVM 218 then converts these requests to read or write operations to those commands understood by the underlying physical I/O device (e.g., a USB thumb drive, CD-ROM drive, etc.).

Virtual Technology (VT) supported by the processor package may be used to implement the PVM. VT is well known in the art and will not be further described herein. By programming a Virtual Machine Control Structure (VMCS) in the processor (as is known in the art), the PVM is able to capture those related I/O port accesses, hence there is no need to modify the OS kernel when using embodiments of the present invention. Benefiting from VT, the PVM is OS-independent, which means that all OSs compatible with the computing system may be run on a PVM-enabled computing system.

In order to instantiate a uniform storage device, the PVM may be started by the system firmware during computing system initialization processing (i.e., during boot time), and before loading of the OS. In an embodiment, the PVM performs at least several initialization steps.

Figure 3:
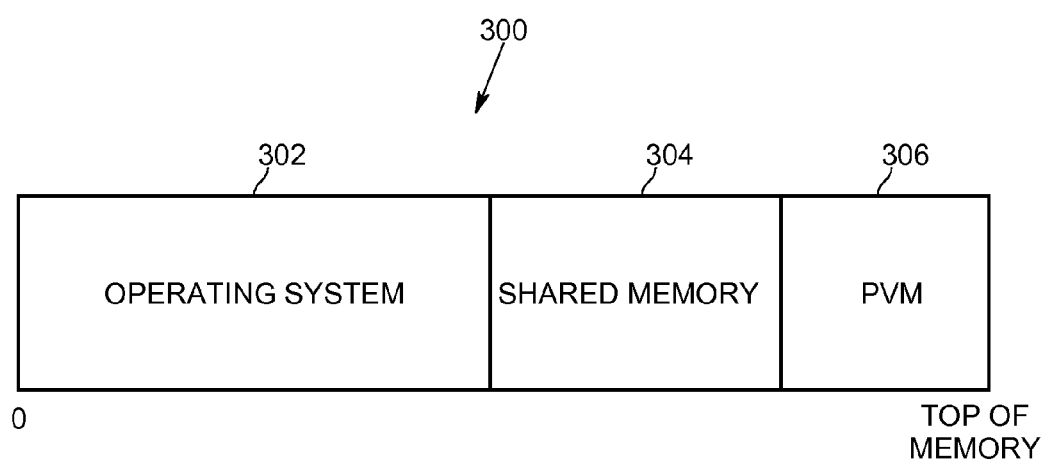
FIG. 3 is a diagram of a memory map according to an embodiment of the present invention.

Before the OS is loaded, system firmware 212 reserves a range of memory for use by the PVM. FIG. 3 is a diagram of a memory map according to an embodiment of the present invention. In an embodiment, the physical memory space of the computing system may be partitioned as shown. The OS may have access to an OS range 302. In one embodiment this range may start at the beginning of the memory. A shared memory space 304 may be reserved for data exchanges between the OS and the PVM. In one embodiment the shared memory space may be in the memory higher contiguously than the OS range. A PVM memory space 306 may be reserved at the top of memory in one embodiment. In other embodiments, other allocations and arrangements of memory may also be used. PVM memory is hidden from the OS. The OS cannot access PVM memory 306.

The PVM enumerates at least one virtual I/O controller and reports an I/O device when the OS scans for information about the virtual I/O controller during startup. In one embodiment, the virtual I/O controller is a virtual ATA controller and the I/O device is an ATA device. Once a request for I/O is captured by the PVM, the task of handling I/O requests may be performed by PVM components called an I/O controller emulator and an I/O device emulator (described below) corresponding to the instantiated virtual I/O device. Existence of and access to the underlying physical I/O device may be hidden by the PVM. The physical I/O device should not be detected by the OS to avoid conflicting access by the PVM and the OS. Prior to the launching of the OS, the software model for an I/O controller is established such that the 'discovery'/'configuration'/'interaction' of the device would happen as normal due to it being virtualized, but in reality the OS (without knowing it) is interacting with the software emulation of the real I/O hardware. The PVM takes control of the timer interrupt in the OS so that when performing I/O request translation tasks the PVM is able to "steal" processor execution cycles from the OS. Once these initialization steps have been performed, the PVM waits for I/O requests from the OS.

Figure 4:
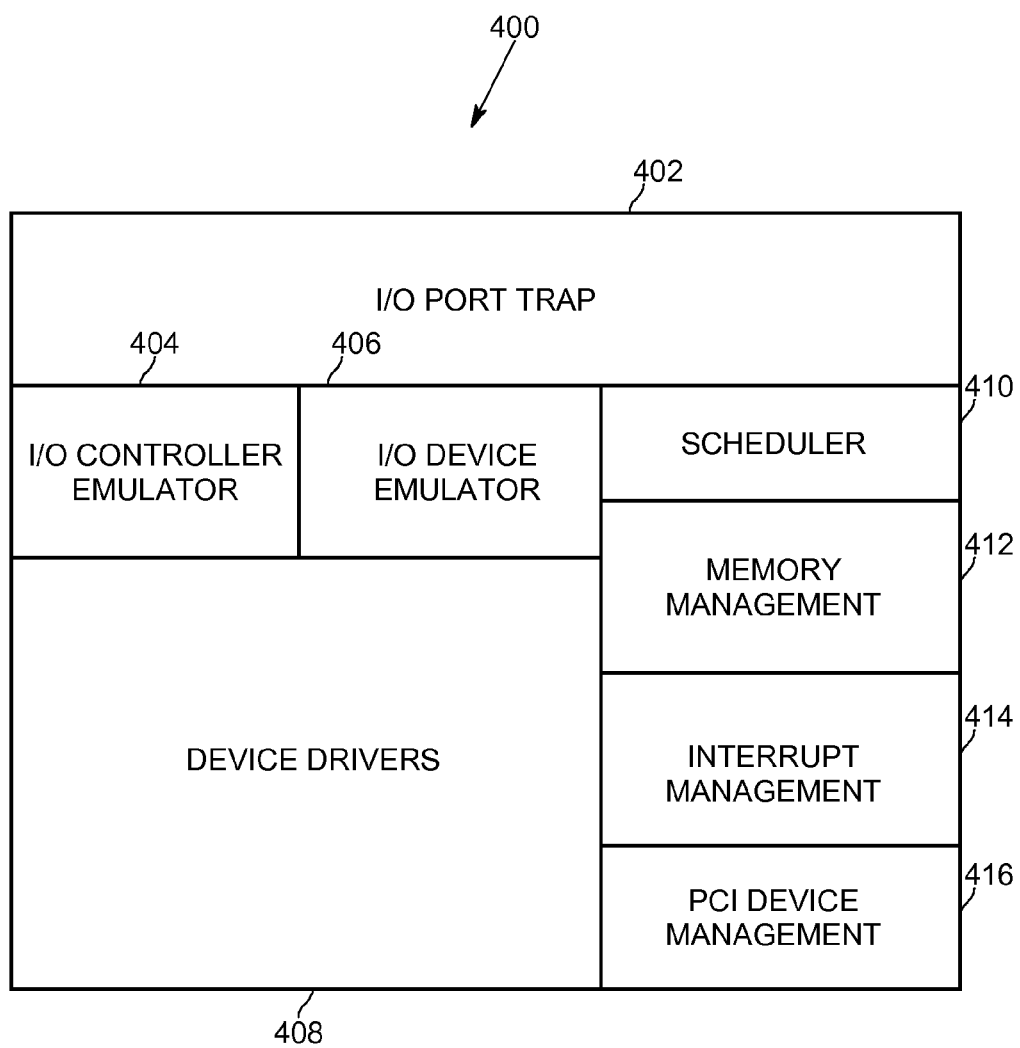
FIG. 4 is a diagram of a partial virtualization machine according to an embodiment of the present invention.

The PVM comprises several functional components to handle the translation of I/O requests from the virtual I/O device to the underlying physical I/O device. FIG. 4 is a diagram of a partial virtualization machine 400 according to an embodiment of the present invention. I/O port trap component 402 captures read or write operations to I/O ports that are issued by the OS. The I/O requests may then be delivered to the emulators. The I/O controller emulator component 404 handles I/O requests that are I/O control requests to the instantiated virtual I/O controller. In an embodiment where the virtual I/O controller comprises a virtual ATA controller, the I/O controller emulator component comprises an ATA controller emulator. The I/O device emulator component 406 emulates the specific physical I/O device being accessed and handles I/O requests that are I/O access requests. In an embodiment, the I/O device emulator comprises an ATA device emulator, and the device being emulated may be any device supporting the ATA interface such as a virtual hard disk, a virtual CDROM, etc. Both emulators comprise event driving state machines and I/O access is the trigger source for action by the emulators. Depending on implementation-dependent usage scenarios, different device drivers 408 may be included in the PVM. For example, if the user wants to instantiate a virtual hard disk on a USB thumb drive, the device drivers of the USB thumb drive and the corresponding USB controller may be included in the PVM. Device drivers communicate with the physical I/O device based at least in part on the I/O control requests and the I/O access requests.

The other PVM components shown in FIG. 4 comprise complementary modules which assist in the translation of I/O requests and access to the physical I/O devices. Other components include a scheduler 410 to schedule events which might occur during several visits to the virtualized domain. For example, there may be an I/O request which takes four times as long as one normally remains in the context of the PVM. If only a portion of the I/O transaction has been completed, the scheduler would track and manage that, along with other transactions which are pending. Also include are memory management 412 to manage allocation and de-allocation of the PVM memory space, interrupt management 414 to handle interrupts triggered by the hidden I/O device, and PCI device management 416 to hide the I/O device from the OS. These PVM components may be similar to corresponding modules within the OS, but smaller, faster, and simpler.

In one embodiment, the I/O interface being handled may be the ATA interface. Implementation of a uniform storage device as a virtual ATA controller within the PVM may be useful for several reasons. First, most available operating systems include an ATA device driver and store either system or user data on an ATA storage device (e.g., a hard disk). The ATA device driver is a basic device driver and will be a part of most operating systems for the long term. Second, the ATA interface defines an asynchronous method to read and write data which comprises direct memory access (DMA). Benefitting from this DMA mode, the PVM handles the read/write requests asynchronously, which means when accessing large amounts of data the PVM will not block the OS from running. When an ATA read/write command is captured by the PVM, the PVM calls the appropriate device driver to start the read/write process. The PVM does not wait until the data is ready for transfer. Instead, the PVM immediately returns control to the OS. In the next timer slice, the PVM steals processor cycles to perform the read/write of data. After the data is ready for the OS, the PVM creates an interrupt to notify the OS. Third, the ATA specification supports the plug & play feature. When the underlying physical I/O device is removed from the computing platform, the PVM has the capability to notify the OS of this event by changing the virtual ATA controller's status register.

Figure 5:
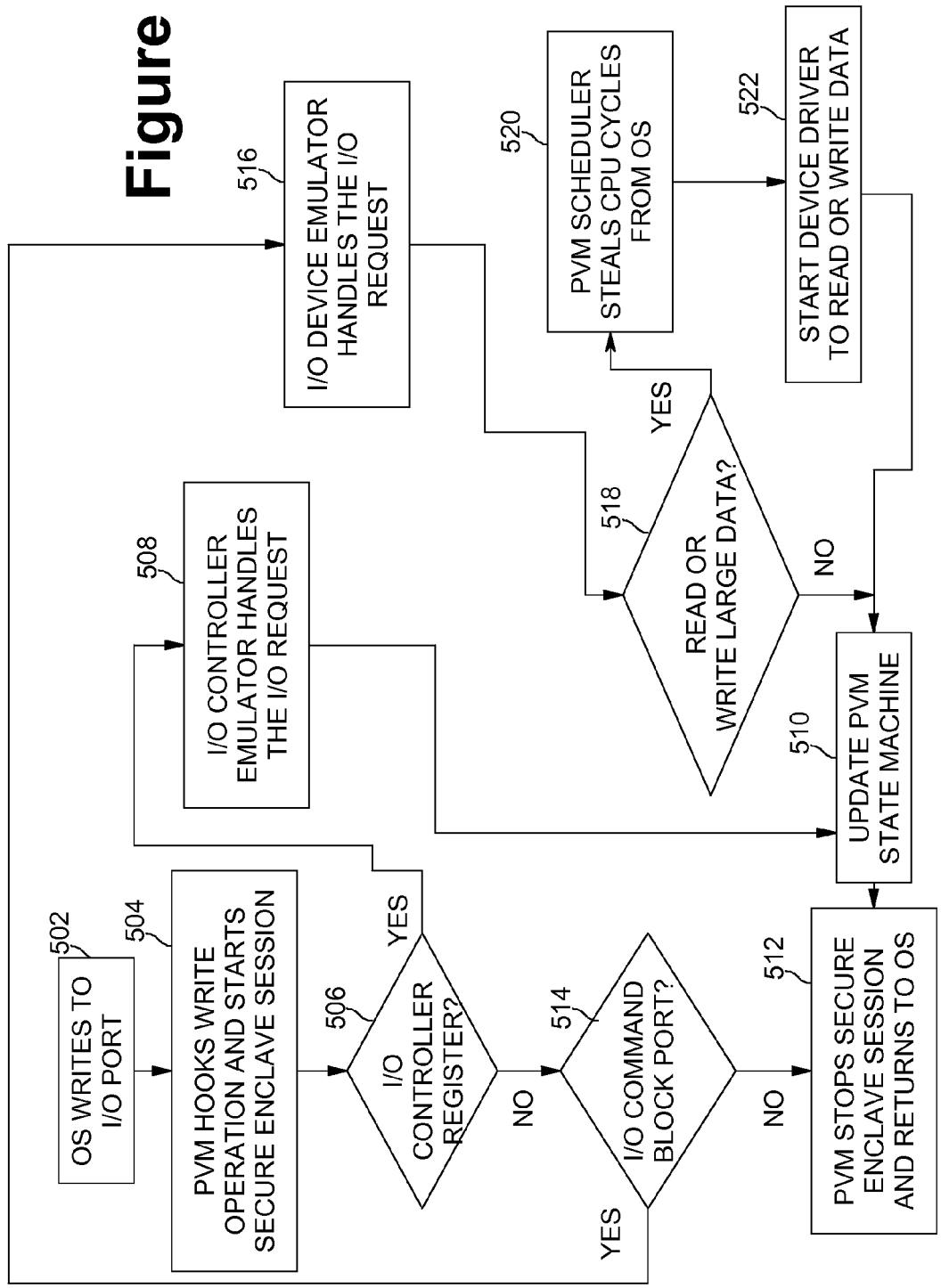
FIG. 5 is a flow diagram of system processing according to an embodiment of the present invention.

FIG. 5 is a flow diagram of system processing according to an embodiment of the present invention. At 502, OS 204 writes to a selected I/O port via I/O driver 216, indicating that a read or write request needs to be performed. I/O port trap 402 of PVM 218 detects the writing of the I/O port and "hooks" the write operation at 504. The PVM also starts a Secure Enclave session at 504 to protect the subsequent I/O processing. While the PVM is operating within the Secure Enclave, the PVM's processing is protected, and the OS and application programs cannot see what the PVM is doing (i.e., the PVMs activity cannot be traced). At 506, if the I/O request references the I/O controller register (one of the available I/O ports), then processing continues with block 508. Typical requests may include ReadBlock, WriteBlock, and ConfigureDevice. The requests may vary depending on the type of controller. Other, less frequently used requests may include reset and flush, and may vary depending on I/O hardware.

At 508, I/O controller emulator 404 handles the I/O request. Next, at 510, the PVM updates its internal PVM state machine to reflect the handling of the I/O request. In one embodiment, states may be as follows:

1) Queued Transaction (transaction in queue, but not acted upon yet;
2) Pending Transaction (transaction which has been active, but not yet completed. This would typically happen when a request requires several iterations for completion (which may not be uncommon). It is also the next transaction to be worked on when in the PVM context; and
3) Completed Transaction (transaction which has been processed with no errors).

Transactions may otherwise be processed as a FIFO (First-in/First Out) queue—where #2 is processed (if any) and then the oldest transaction in #1 (queued state) would be processed.

Processing continues at 512, with the PVM stopping the current Secure Enclave session and returning control back to the OS. At 506, if the I/O request does not reference the I/O controller register, then processing continues at block 514. At 514, if the I/O request references the I/O command block port (one of the available I/O ports), then processing continues with block 516. If the I/O request does not reference the I/O command block port, then at 512 the PVM stops the current Secure Enclave session and returns control back to the OS. At 516, I/O device emulator 406 handles the I/O request. At 518, the I/O device emulator determines if the I/O request is to read or write a large amount of data (what is "large" is implementation dependent). If the read or write request is for a large amount of data, then at 520 PVM scheduler 410 steals CPU cycles from the OS. This means that an implementation of the PVM would schedule the PVM to be revisited due to a periodic timer in a somewhat frequent basis so that it can process the requested transaction. Since normally the PVM is largely passive, when a transaction is in the pending state, the PVM would ensure it gets more attention so that it can process the transactions by having the system switch to its context frequently. It cannot remain in the context throughout the entire time since most OSs cannot sustain stability when the computer platform is "stolen" from it for an extended period of time. Therefore the PVM will obtain sufficient processor cycles to accomplish its job, but not enough to cause resource allocation problems within the OS context. The PVM at 522 starts the appropriate one of device drivers 408 to read or write the data. If the amount of data to be read or written is not large at 518, then blocks 520 and 522 are skipped. A PVM has a priori knowledge of how long the system is allowed to remain in context of the PVM before having to relinquish control back to the OS. Since the PVM will interact directly with the real I/O hardware, the PVM will know whether or not a particular transaction has been completed by the I/O hardware. In either case, at 510, the PVM updates its internal PVM state machine to reflect the handling of the I/O request. Finally, processing continues at 512, with the PVM stopping the current Secure Enclave session and returning control back to the OS.

With an embodiment of the present invention included in a computing system, various usage models may be enabled. For example, for many mobile Internet devices (MIDs), there is not enough memory to install an internal CDROM drive, hence computing system vendors need to develop additional software tools for the user to install an operating system (usually via a bootable USB thumb drive). With embodiments of the present invention, the PVM may be configured to have the PVM generate a virtual CDROM drive based at least in part on the image file in the USB thumb drive, thereby allowing the OS to be installed in the traditional manner. Many installation programs for OSs have presumptions about where they get installed from. Embodiments of the present invention enable the ability to take a linear set of information that resides on a USB thumb drive, and have the PVM present a CD software model for it so that the underlying information would seem to be sourced from a CD device, but in reality the PVM is acting as a conduit to a physical USB device when the OS thinks it is talking to a CD device.

Typically OSs are loaded from a hard disk drive at a specified location, and the OS assumes this to be the case. However, in some situations it may be desirable to load the OS from another storage device (e.g., from a USB thumb drive). This usage case is popular among support engineers for some computing systems. Once the OS of a computing system becomes corrupted and fails to start, the support engineer may start a clean version of the OS in order to diagnose the computing system's hardware and software. Traditionally, this diagnostics environment needs to be developed or customized by the manufacturer of the computing system because of the assumption about the OS load location (e.g., on a hard disk drive). However, in embodiments of the present invention, the support engineer may configure the PVM to generate a virtual hard disk drive based on a USB thumb drive, and the clean OS may be started directly from the USB thumb drive, without further development efforts by the manufacturer.

The PVM may also be used to protect the intellectual property of a storage device vendor. In one example, the Linux kernel has a General Public License (GPL), hence any kernel module developed for Linux should open source the kernel module's code as well. If a vendor wants to enable the vendor's storage device on Linux, the vendor has to develop a device driver, which usually is a kernel module. This kernel module's source code may then become public, which may be undesirable for the vendor. In embodiments of the present invention, the vendor may develop a device driver included in the PVM for the vendor's storage device, and the PVM may be configured to generate a virtual ATA device above the vendor's physical storage device. Since the vendor's device driver is in the PVM, and the PVM's operations are protected via the Secure Enclave, the vendor's device driver is protected. Thus, the vendor protects its intellectual property by avoiding developing a device driver specifically for the GPL OS. Extending this usage model, the vendor may develop only one device driver for the PVM, and various OSs may be able to access the vendor's storage device via the PVM, instead of the vendor developing a separate device driver for each supported OS.

Additionally, if the underlying physical device is a hard disk drive, the PVM may be used to preserve an area of memory in the hard disk drive, and hide this area for specific uses, such as system recovery or data protection.

One skilled in the art will recognize the option of implementing different schemes to provide a uniform storage device via a PVM—without deviating from the scope of the present invention. One skilled in the art will also recognize that the disclosed invention may be applied to different types of virtualized environments and virtualization systems, pure software or hardware-assisted, that may employ either partial or complete virtualization of computer systems or programming environments.

Furthermore, one skilled in the art will recognize that embodiments of the present invention may be implemented in other ways and using other programming languages.

The techniques described herein are not limited to any particular hardware or software configuration; they may find applicability in any computing or processing environment. The techniques may be implemented in logic embodied in hardware, software, or firmware components, or a combination of the above. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multi-core processors, multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the scope of the invention.

What is claimed is:

1. A computing system including a processor package comprising:
   an operating system;
   a physical I/O device;
   a memory partitioned into a first portion for use by the operating system, a second portion for sharing data between the operating system and a partial virtual machine, and a third portion for use by the partial virtual machine, wherein the third portion is hidden from the operating system; and
   the partial virtual machine to instantiate a virtual I/O device corresponding to the physical I/O device, the virtual I/O device having a virtual I/O controller, comprising:
      an I/O port trap component to capture an I/O request to the virtual I/O device from the operating system;
      an I/O controller emulator component coupled to the I/O port trap component to handle an I/O control request to the virtual I/O controller, when the I/O request comprises an I/O control request;
      an I/O device emulator component coupled to the I/O port trap component to handle an I/O access request to communicate with the virtual I/O device, when the I/O request comprises an I/O access request; and
      a device driver component coupled to the I/O controller emulator component and the I/O device emulator component to communicate with the physical I/O device based at least in part on the I/O control request and the I/O access request;
      wherein the partial virtual machine executes within a secure enclave session within the processor package, preventing access to the partial virtual machine by the operating system.

2. The computing system of claim 1, wherein the virtual I/O device comprises a virtual ATA device, the virtual I/O controller comprises a virtual ATA controller, and the physical I/O device comprises an ATA device.

3. The computing system of claim 1, wherein the virtual I/O device comprises a virtual SCSI device, the virtual I/O controller comprises a virtual SCSI controller, and the physical I/O device comprises a SCSI device.

4. The computing system of claim 1, wherein the virtual I/O device comprises a virtual USB device, the virtual I/O controller comprises a virtual USB controller, and the physical I/O device comprises a USB device.

5. The computing system of claim 1, wherein the physical I/O device is hidden from the operating system.

6. The computing system of claim 1, wherein the partial virtual machine is OS-independent.

7. In a computing system having an operating system, a processor package, a partial virtual machine, and a memory partitioned into a first portion for use by the operating system, a second portion for sharing data between the operating system and the partial virtual machine, and a third portion for use by the partial virtual machine, wherein the third portion is hidden from the operating system, a method of providing a virtual I/O device corresponding to a physical I/O device comprising:
   instantiating the virtual I/O device by the partial virtual machine, the virtual I/O device having a virtual I/O controller, the partial virtual machine executing within a secure enclave session within the processor package thereby preventing access to the partial virtual machine by the operating system;
   capturing an I/O request from the operating system to the virtual I/O device by an I/O port trap component of the partial virtual machine;
   when the I/O request comprises an I/O control request to the virtual I/O controller, handling the I/O control request by an I/O controller emulator component of the partial virtual machine, the I/O controller emulator communicating with a device driver of the partial virtual machine associated with the physical I/O device to perform the I/O control request; and
   when the I/O request comprises an I/O access request, handling the I/O access request by an I/O device emulator component of the partial virtual machine, the I/O device emulator communicating with a device driver of the partial virtual machine associated with the physical I/O device to perform the I/O access request.

8. The method of claim 7, wherein the virtual I/O device comprises a virtual ATA device, the virtual I/O controller comprises a virtual ATA controller, and the physical I/O device comprises an ATA device.

9. The method of claim 7, wherein the virtual I/O device comprises a virtual SCSI device, the virtual I/O controller comprises a virtual SCSI controller, and the physical I/O device comprises a SCSI device.

10. The method of claim 7, wherein the virtual I/O device comprises a virtual USB device, the virtual I/O controller comprises a virtual USB controller, and the physical I/O device comprises a USB device.

11. The method of claim 7, further comprising hiding the physical I/O device from the operating system by the partial virtual machine.

12. The method of claim 7, wherein the partial virtual machine is OS-independent.

13. The method of claim 7, further comprising starting a secure enclave session by the partial virtual machine after capturing the I/O request and stopping the secure enclave session by the partial virtual machine before returning control to the operating system after handling the I/O request.

14. An article comprising: a non-transitory machine readable medium having a plurality of machine instructions, wherein when the instructions are executed by a processor within a computing system, the instructions provide for:
   instantiating a virtual I/O device corresponding to a physical I/O device of the computing system by a partial virtual machine, the virtual I/O device having a virtual I/O controller, the partial virtual machine executing within a secure enclave session within a processor package of the computing system thereby preventing access to the partial virtual machine by an operating system of the computing system;
   capturing an I/O request from the operating system to the virtual I/O device by an I/O port trap component of the partial virtual machine;
   when the I/O request comprises an I/O control request to the virtual I/O controller, handling the I/O control request by an I/O controller emulator component of the partial virtual machine, the I/O controller emulator communicating with a device driver of the partial virtual machine associated with the physical I/O device to perform the I/O control request;
   when the I/O request comprises an I/O access request, handling the I/O access request by an I/O device emulator component of the partial virtual machine, the I/O device emulator communicating with a device driver of the partial virtual machine associated with the physical I/O device to perform the I/O access request; and
   starting a secure enclave session by the partial virtual machine after capturing the I/O request and stopping the secure enclave session by the partial virtual machine before returning control to the operating system after handling the I/O request.

15. The article of claim 14, wherein the virtual I/O device comprises a virtual ATA device, the virtual I/O controller comprises a virtual ATA controller, and the physical I/O device comprises an ATA device.

16. The article of claim 14, further comprising instructions for hiding the physical I/O device from the operating system by the partial virtual machine.

17. The article of claim 14, wherein the partial virtual machine is OS-independent.

* * * * *